US008504050B2

(12) United States Patent　　(10) Patent No.: US 8,504,050 B2
Kwon et al.　　(45) Date of Patent: Aug. 6, 2013

(54) COMMUNICATION SYSTEM AND METHOD OF PERFORMING MULTI-CELL COMMON OPERATION

(75) Inventors: Tae Soo Kwon, Hwaseong-si (KR); Jung Min Moon, Seoul (KR); Dong Ho Cho, Seoul (KR); O Hyun Jo, Cheongju-si (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 323 days.

(21) Appl. No.: 12/850,682

(22) Filed: Aug. 5, 2010

(65) Prior Publication Data

US 2011/0151872 A1　Jun. 23, 2011

(30) Foreign Application Priority Data

Dec. 18, 2009　(KR) ......................... 10-2009-0126593

(51) Int. Cl.
*H04W 72/00*　(2009.01)
(52) U.S. Cl.
USPC ......................................... 455/450; 370/329
(58) Field of Classification Search
USPC .................................. 455/466, 450; 370/338
See application file for complete search history.

(56) References Cited

U.S. PATENT DOCUMENTS

| 2004/0174845 | A1 | 9/2004 | Koo et al. |
| 2005/0064872 | A1* | 3/2005 | Osseiran et al. ............ 455/452.1 |
| 2005/0227697 | A1* | 10/2005 | Borst et al. .................... 455/450 |
| 2011/0019638 | A1* | 1/2011 | Hamel et al. .................. 370/331 |

FOREIGN PATENT DOCUMENTS

| EP | 1 124 347 | | 8/2001 |
| KR | 10-2001-0082061 | | 8/2001 |
| KR | 10-2003-0064219 | | 7/2003 |
| KR | 10-2003-0084243 | | 11/2003 |
| KR | 10-2007-0061365 | | 6/2007 |
| KR | 10-2009-0071301 | A | 7/2009 |
| KR | 10-2009-0101760 | A | 9/2009 |
| KR | 10-2009-0128343 | A | 12/2009 |
| WO | WO 2009048359 | A1 * | 4/2009 |

OTHER PUBLICATIONS

International Search Report and Written Opinion of the International Searching Authority issued on May 2, 2011, in counterpart International Application No. PCT/KR2010/006058 (7 pages, in English).
"Method and Principles of Uplink Synchronization," *CWTS WGI*, TSG-RAN Working Group 1 (Radio) meeting #5, Cheju, South Korea, Jun. 1-4, 1999, (6 pages).

* cited by examiner

*Primary Examiner* — Marcos Batista
(74) *Attorney, Agent, or Firm* — NSIP Law

(57) ABSTRACT

A common operating set including a plurality of cells may be set, and common radio resources may be allocated to enable the plurality of cells to perform a multi-cell common operation. Unique uplink radio resources may be allocated to each of terminals in the common operating set within the common radio resources, and each of the terminals may transmit corresponding uplink feedback information to a plurality of base stations based on corresponding unique uplink radio resources. Accordingly, each of the base stations may recognize information associated with a wireless environment between each of terminals and a corresponding base station.

20 Claims, 10 Drawing Sheets

| CELL 1 | CELL 2 | CELL 3 | CELL 4 |
|--------|--------|--------|--------|
| CELL 5 | CELL 6 | CELL 7 | CELL 8 |
| CELL 9 | CELL 10 | CELL 11 | CELL 12 |
| CELL 13 | CELL 14 | CELL 15 | CELL 16 |

COMMON OPERATING SET

COMMUNICATION SYSTEM AND METHOD OF PERFORMING MULTI-CELL COMMON OPERATION

CROSS-REFERENCE TO RELATED APPLICATION(S)

This application claims the benefit under 35 U.S.C. §119(a) of Korean Patent Application No. 10-2009-0126593, filed on Dec. 18, 2009, in the Korean Intellectual Property Office, the entire disclosure of which is incorporated herein by reference for all purposes.

BACKGROUND

1. Field

The following description relates to a technology that manages/operates radio resources used for transmission/reception of information associated with a wireless environment of terminals, a signal for synchronization, and control information of base stations.

2. Description of Related Art

Recently, a communication technology that uses a small cell such as a femtocell and a picocell has rapidly developed. A femtocell is a small cellular base station, typically designed for use in a home or small business. A picocell is a wireless communication system typically covering a small area, such as within a building, or in a vehicle, such as an airplane. A picocell is analogous to a Wi-Fi access point.

As new communication systems including the small cell are developed, research on technologies, such as interference alignment, dynamic spectrum management, interference control, etc., for interference control is continuously performed to develop schemes that overcome an interference occurring between the small cells or an interference occurring between the small cell and a macrocell. In addition, a technology that controls a topology of a network including a plurality of cells is also considered to be important. Examples of topologies of the network may include a bus type, a ring type, a star type, a tree type, a message type, etc.

To perform the interference control or topology control, it is desirable that terminals and base stations effectively perform transmission/reception of a variety of information. In this case, there is a desire for a technology that effectively manages/operates radio resources used for the transmission/reception of the information between the terminals and the base stations.

Also, in general, each of the base stations performs transmission/reception of the information with a terminal in a corresponding cell or with a predetermined terminal. When each of the base stations performs transmission/reception of the information with a terminal in another cell or with all terminals, sufficient information may be collected for optimal interference control or optimal topology control.

Figure 1:
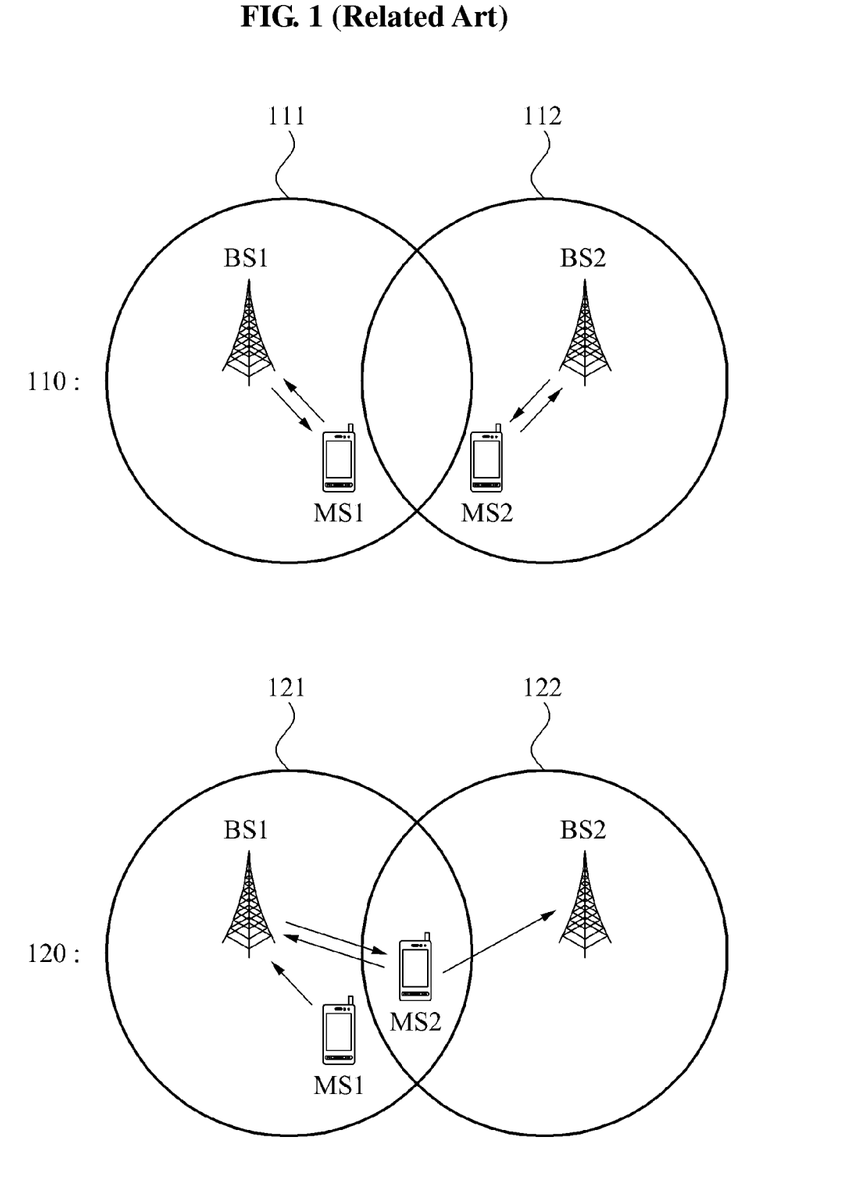
FIG. 1 is a diagram illustrating a case in which information associated with a wireless environment is transmitted/received in each cell and a case in which the information associated with a wireless environment is transmitted/received between cells.

FIG. 1 illustrates a first example 110 in which information associated with a wireless environment is transmitted/received in each cell and a second example 120 in which the information associated with a wireless environment is transmitted/received between cells.

Referring to the first example 110 of FIG. 1, a cell 111 may include a base station 1 (BS1) and a terminal 1 (MS1), and a cell 112 may include a base station 2 (BS2) and a terminal 2 (MS2). Uplink control information, (hereinafter "uplink feedback information"), downlink control information (hereinafter "broadcasting information"), and control signaling, as an example, a pilot, sounding, etc., may be transmitted/received between the BS1 and the MS1. In the same manner, the uplink feedback information, the downlink control information, the control signaling, etc., may be transmitted/received between the BS2 and the MS2. In the first example 110, each of the MS1 and the MS2 may perform transmission/reception of the uplink feedback information, the downlink control information, the control signaling, etc., with a corresponding service base station. In this instance, each of the BS1 and the BS2 may individually allocate radio resources for a corresponding terminal. That is, the BS1 may independently allocate radio resources to the MS1 to perform transmission/reception with the MS1, and also, the BS2 may independently allocate radio resources to the MS2 to perform transmission/reception with the MS2. Information may be exchanged between cells to control a network topology and inter-cell interference. However, a communication system of the first example 110 may not consider inter-cell information exchange, and thus control of the network topology and the inter-cell interference may not be effectively performed. As an example, when the BS1 does not recognize information associated with a wireless environment between the BS1 and the MS2, for example, information associated with a channel and information associated with a mobility of the MS2, and the like, and the BS2 does not recognize information associated with a wireless environment between the BS2 and the MS1, cooperation between the cell 111 and the cell 112 may not be expected.

Referring to the second example 120 of FIG. 1, a cell 121 may include a base station 1 (BS1), a terminal 1 (MS1), a terminal 2 (MS2) and a cell 122 may include a base station 2 (BS2) and the terminal 2 (MS2).

The two cells 121 and 122 are cooperating in the second example 120. The MS2 located in a boundary of the two cells 121 and 122 simultaneously transmits uplink feedback information to the BS1 and the BS2. Also, the MS2 may receive downlink control information from the single BS1. In the second example 120, only the MS2 located in the boundary may transmit the uplink feedback information to the BS1 and the BS2, and the MS1 may transmit only to the BS1. That is, when a portion of terminals transmits uplink feedback information to all base stations, uplink feedback information of remaining terminals may not be appropriately shared, and thus, a topology control or an interference control may be difficult to be performed optimally in an entire communication system.

Accordingly, all terminals are desired to transmit corresponding uplink feedback information to all base stations, and effective allocation of limited radio resource to each of the terminals is important for each of the terminals to transmit the corresponding uplink feedback information to the all base stations.

Example embodiments define a "common operating set" where a multi-cell common operation related to the interference control or the network topology control is performed, and separately manages the "common radio resources" for a plurality of cells in the common operating set. Unique uplink radio resources for terminals in the common operating set may also be allocated within the common radio resources. Each of the terminals may transmit corresponding uplink feedback information to all base stations using corresponding unique uplink radio resources. In this instance, each of the base stations may receive uplink feedback information from all the terminals, and a central controlling apparatus may collect the uplink feedback information received by the base stations. Accordingly, the central controlling apparatus may recognize all information associated with a wireless environment between each of the terminals and each of the base stations, and thus, an optimal topology control and an optimal interference control may be performed. As an example, in the second example 120 of FIG. 1, the central controlling apparatus according to example embodiments may recognize all information associated with a wireless environment between the MS1 and the BS1, between the MS1 and the BS2, between the MS2 and the BS1, and between MS2 and BS2.

SUMMARY

In one general aspect, there is provided a method of operating central controlling apparatus, the method including: setting a common operating set including a plurality of cells that perform a multi cell common operation related to either an interference control or a network topology control, allocating unique uplink radio resources to each of terminals in the common operating set among common radio resources allocated in advance for the common operating set, to enable each of the terminals to transmit corresponding uplink feedback information to a plurality of base stations, and collecting uplink feedback information of each of the terminals from the plurality of base stations, the uplink feedback information including information associated with a wireless environment of a corresponding terminal and a corresponding base station.

The method may further include processing the collected uplink feedback information to perform the interference control and the network topology control.

The method may further include that the allocating allocates, to each of the terminals, identical time resources, identical frequency resources, and different code resources within the common radio resources allocated in advance.

The method may further include determining transmission power of the terminals based on a spatial area of the common operating set.

The method may further include that the setting sets the common operating set based on either a current topology of the network or a cooperation status between the plurality of cells.

The method may further include that the uplink feedback information of each of the terminals includes information associated with a channel between a corresponding terminal and a corresponding base station.

The method may further include: allocating unique downlink radio resources to each of the plurality of base stations among the common radio resources allocated in advanced for the common operating set, to enable terminals in the common operating set to receive corresponding control information from the plurality of base stations, and requesting each of the plurality of base stations to broadcast of the corresponding control information.

In another general aspect, there is provided a method of operating a base station, the method including: receiving, from a central controlling apparatus, a request for uplink feedback information after a common operating set is set, the common operating set including a plurality of cells that perform a multi-cell common operation related to an interference control or network topology control, allocating unique uplink radio resources to each of terminals included in a target cell within common radio resources allocated in advance for the common operating set, to enable each of the terminals included in the target cell among terminals in the common operation set to transmit corresponding uplink feedback information to a plurality of base stations, and receiving uplink feedback information of each of the terminals in the common operating set.

The method may further include reporting, to the central controlling apparatus, about the received uplink feedback information.

The method may further include: receiving, from the central controlling apparatus, a request related to either the interference control or the network topology control, and controlling wireless parameters related to the request about either the interference control or the network topology control.

In another general aspect, there is provided a method of operating a terminal, the method including: receiving a request, from a serving base station, for uplink feedback information after a common operating set is set, the common operating set including a plurality of cells that perform a multi-cell common operation related to an interference control or a network topology control, recognizing unique uplink radio resources allocated to a target terminal and transmission power of the target terminal, the unique uplink radio resources being allocated to the target terminal within common radio resources allocated in advance for the common operating set, and transmitting, to a plurality of base stations in the common operating set, corresponding uplink feedback information using the unique uplink radio resources and the transmission power.

In another general aspect, there is provided a method of operating a central controlling apparatus, the method including: setting a common operating set including a plurality of cells that perform a multi-cell common operation related to uplink synchronization, allocating a unique ranging code to each of terminals included in a common operating set within common radio resources allocated in advance for the common operation set, transmitting a ranging report message to a plurality of base stations in the common operating set to report that a target terminal performs ranging, collecting information associated with a unique ranging code of the target terminal from each of the plurality of the base stations, information associated with the unique ranging code of the target terminal being received by each of the plurality of base stations, setting an uplink synchronization between each of the plurality of base stations and the target terminal based on the information associated with the unique ranging code of the target terminal, the information associated with the unique ranging code of the target terminal being received by each of the plurality of base stations, and providing information associated with the set uplink synchronization to the target terminal.

The method may further include selecting a target base station for handover of the target terminal from a known uplink synchronization set including the plurality of base stations, an uplink synchronization of each of the plurality of base stations being known to the target terminal.

The method may further include that the selecting selects the target base station for handover of the target terminal from a candidate set including at least one of the plurality of base stations in the known uplink synchronization set, the at least one base station having a signal strength greater than or equal to a predetermined level.

The method may further include that the allocating allocates, to each of the terminals included in the common operating set, identical time resources, identical frequency resources, and different unique ranging codes, within the common radio resources allocated in advance.

The method may further include that the information associated with the unique ranging code of the target terminal includes the unique ranging code of the target terminal received by each of the plurality of base stations, and a cell identifier of each of the plurality of base stations.

In another aspect, there is provided a computer-readable recording medium storing a program implementing any of the above-described methods.

Other features and aspects may be apparent from the following detailed description, the drawings, and the claims.

Throughout the drawings and the detailed description, unless otherwise described, to the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

Figure 2:
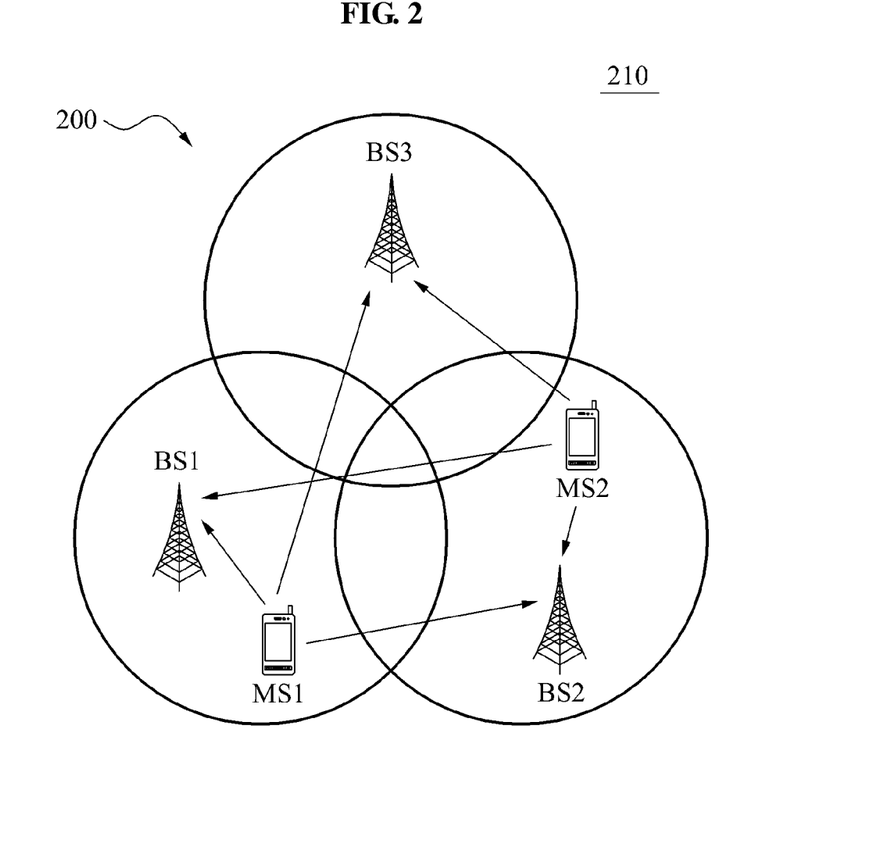
FIG. 2 is a diagram illustrating an example in which each of terminals transmits corresponding uplink feedback information to three base stations according to example embodiments.

FIG. 2 illustrates an example in which each of terminals transmits corresponding uplink feedback information to three base stations according to example embodiments.

Referring to FIG. 2, a communication system that performs cooperation between cells for an interference control or a topology control may include three cells. The communication system 200 also includes a central controlling apparatus 210.

In this instance, a plurality of base stations may exchange a variety of information with each other to perform the interference control or the topology control. A plurality of cells for which the interference control or the topology control is performed may be grouped into a single common operating set.

The three base stations, a BS1, a BS2, and a BS3; and two terminals, an MS1 and an MS2; included in the common operating set may perform transmission/reception of the variety of information to support the interference control or the topology control. The transmission/reception of the variety of information performed for supporting the interference control or the topology control is referred to as a "multi-cell common operation."

Each of the two terminals MS1 and MS2 of FIG. 2 may perform transmitting/receiving of uplink feedback information to all the three base stations BS1, BS2, and BS3. That is, depending on example embodiments, each of the base stations may receive uplink feedback information of all the terminals, and the central controlling apparatus 210 may collect uplink feedback information received by the base stations, performing an optimal topology control and an optimal interference control.

Predetermined common radio resources may be allocated to the common operating set in advance, to perform the multi-cell common operation. Also, unique radio resources may be allocated to each of the terminals in the common operating set within the common radio resources. For example, the common radio resources may include common uplink radio resource and common downlink radio resources, and, within the common uplink radio resource and the common downlink radio resources, unique uplink radio resources and unique downlink radio resources may be allocated to each of the terminals and each of the base stations, respectively.

Figure 3:
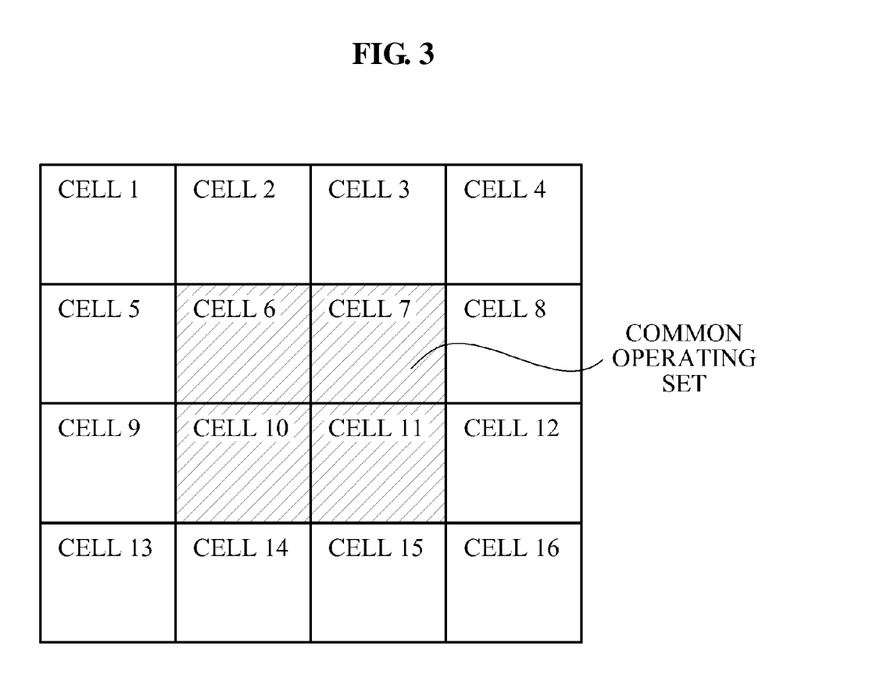
FIG. 3 is a diagram illustrating a common operating set including four cells from among 16 cells.

FIG. 3 illustrates a common operating set including four cells from among sixteen (16) cells.

An example in which 16 cells exist is conceptually illustrated in FIG. 3. In this instance, example embodiments group a plurality of cells for which an interference control or a topology control may be performed resulting in a single common operation set, and may establish a cell 6, a cell 7, a cell 10, and a cell 11 as the single common operating set.

When the single common operating set is set, and the multi-cell common operation is requested after radio resources for the common operating set is defined, unique radio resources may be allocated to each of terminals included in the common operation set within the radio resources.

Figure 4:
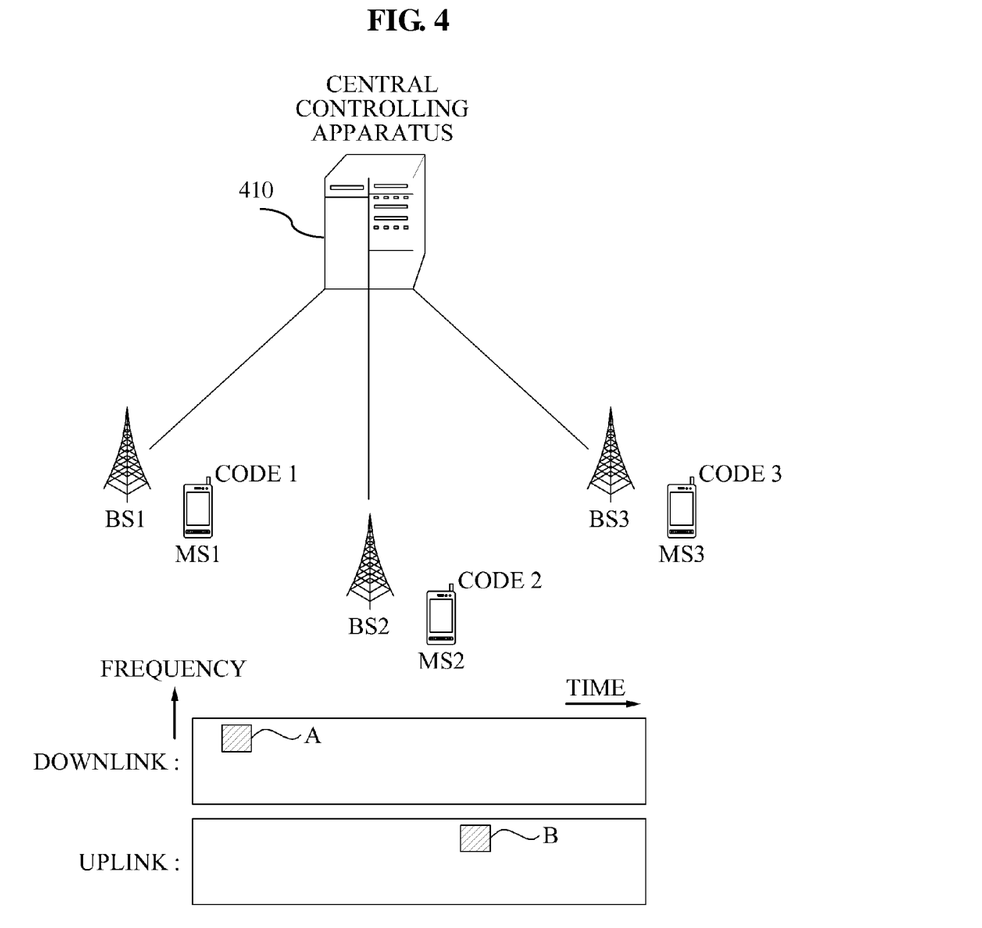
FIG. 4 is a diagram illustrating a plurality of base stations, a plurality of terminals, a central controlling apparatus included in the common operating set, and radio resources allocated in advance for the common operating set.

FIG. 4 illustrates a plurality of base stations, a plurality of terminals, a central controlling apparatus 410 included in the common operating set, and radio resources allocated in advance for the common operating set.

Referring to FIG. 4, a communication system according to example embodiments may include the central controlling apparatus 410 and a plurality of cells. For example, the central controlling apparatus 410 may control the plurality of cells, and each of the plurality of cells may include at least one base station and at least one terminal. It may be presumed that three terminals and three base stations for which an interference control or a network topology control is performed may be set as a single common operating set.

Common radio resources used by the common operating set for performing a multi-cell common operation may be defined when the common operating set is set. As illustrated in FIG. 4, the common radio resources for the common operating set may be defined for each downlink and for each uplink. In FIG. 4, an area A indicates common downlink radio resources, and an area B indicates common uplink radio resources.

The central controlling apparatus 410 may allocate unique uplink radio resources for each of the terminals within the common uplink radio resources when the common radio resources are defined. For example, the radio resource may include frequency resources, time resource, code resources, etc. For instance, the central controlling apparatus 410 may allocate identical time resources and identical frequency resources, and may allocate different code resources, to each of the terminals.

As an example, a terminal 1 (e.g., MS1) may transmit uplink feedback information of the MS1 to base stations 1, 2, and 3 (e.g., BS1, BS2, and BS3) based on a code 1 and frequency resources and time resources of the area B via the central controlling apparatus 410, and uplink feedback information of the MS2 may be transmitted by a terminal 2 (e.g., MS2) to the BS1, the BS2, and the BS3 based on a code 2 and the frequency resources and the time resources of the area B via the central controlling apparatus 410. Also, a terminal 3 (e.g., MS3) may transmit uplink feedback information of MS3 to the BS1, the BS2, and the BS3, based on a code 3 and the frequency resource and time resources via the central controlling apparatus 410.

Also, the central controlling apparatus 410 may allocate unique downlink radio resources for each of the base stations within the common downlink radio resources. In one example, each of the base stations may transmit, to a predetermined terminal or a desired terminal, corresponding control information, e.g., downlink control information such as broadcasting information, based on corresponding unique downlink radio resources.

Figure 5:
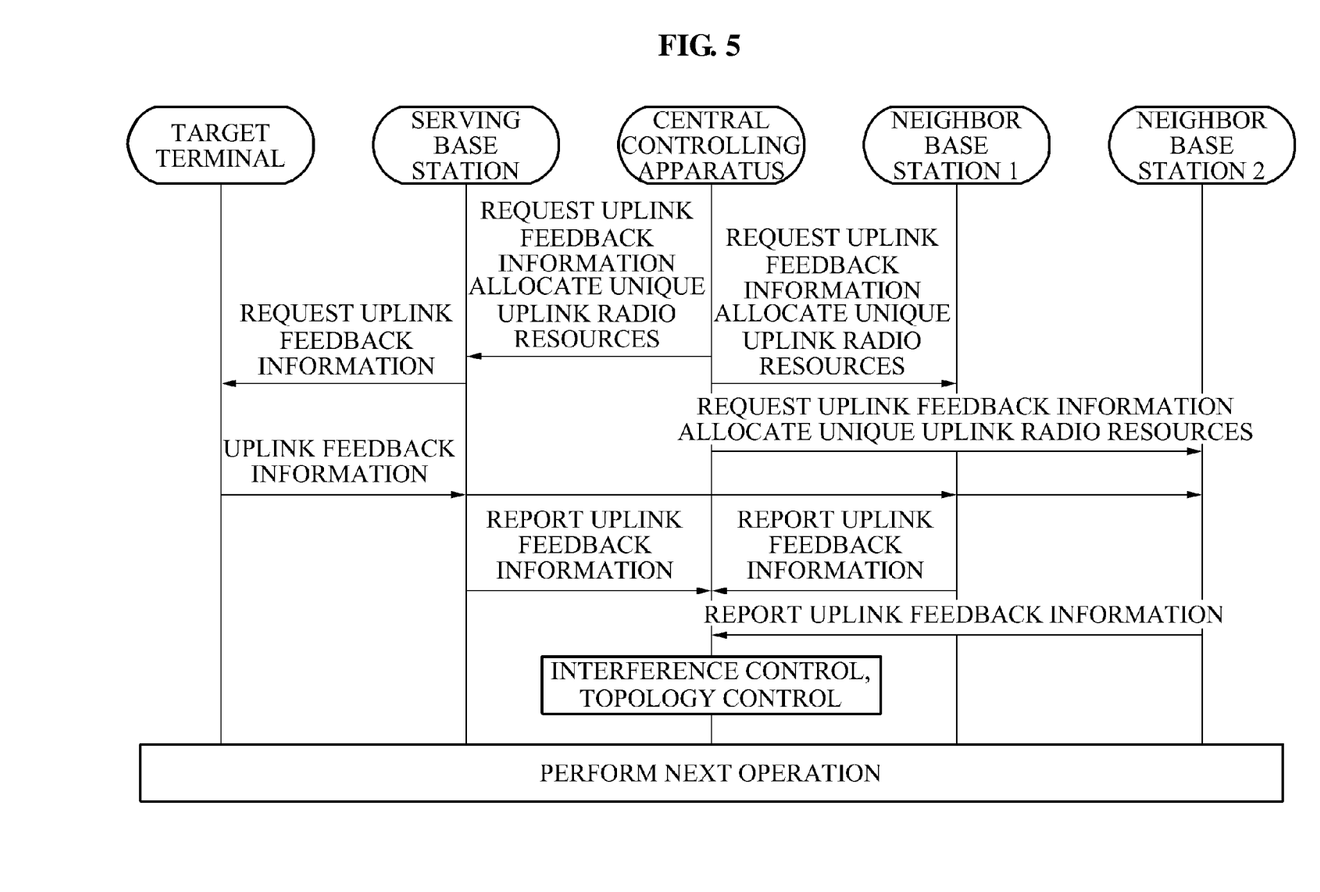
FIG. 5 is a flowchart illustrating a method of operating various apparatuses included in a common operating set according to example embodiments.

FIG. 5 illustrates a method of operating various apparatuses included in the common operating set according to example embodiments.

Referring to FIG. 5, a central controlling apparatus, e.g., 210, 410 may request uplink feedback information of terminals included in the common operating set, from at least one of a serving base station, a neighbor base station 1, and a neighbor base station 2 included in the common operating set. The central controlling apparatus 210, 410 may allocate unique uplink radio resources to each of the terminals within common radio resources allocated in advance for the common operating set, and may transmit information associated with the allocated unique uplink radio resources to a corresponding service base station of each of the terminals.

In one example, the central controlling apparatus 210, 410 may allocate identical time resources and identical frequency resources, and may allocate different code resources, to each of the terminals, within the common radio resources allocated in advance.

Each of the base stations may request uplink feedback information from each of terminals in a corresponding cell. In addition, each of the base stations may transmit, to each of the terminals, information associated with unique uplink radio resources allocated to each of the terminals. Although an example in which the service base station requests uplink feedback information from a target terminal is illustrated in FIG. 5, each of the neighbor base station 1 and the neighbor base station 2 may request corresponding uplink feedback information from each of terminals in a corresponding cell.

The target terminal may transmit the uplink feedback information to all base stations after recognizing unique uplink radio resources. In one example, the target terminal may determine transmission power based on a spatial area of the common operating set, e.g., a distance from the target terminal to each of the service base station, the neighbor base station 1, the neighbor base station 2, etc., and may transmit the uplink feedback information based on the transmission power. For example, the target terminal may sequentially increase the transmission power to enable the uplink feedback information to be transmitted to all the base stations in the common operating set.

In one example, the target terminal may transmit uplink feedback information corresponding to each of the serving base station, the neighbor base station 1, and the neighbor base station 2. That is, uplink feedback information transmitted to the serving base station may include information associated with a wireless environment between the target terminal and the service base station. Further, uplink feedback information transmitted to the neighbor base station 1 may include information associated with a wireless environment between the target terminal and the neighbor base station 1. In addition, uplink feedback information transmitted to the neighbor base station 2 may include information associated with a wireless environment between the target terminal and the neighbor base station 2.

The received uplink feedback information may be reported by each of the serving base station, the neighbor base station 1, and the neighbor base station 2 to the central controlling apparatus 210, 410. Accordingly, the central controlling apparatus 210, 410 may recognize information associated with a wireless environment between the target terminal and each of the base stations, performing an interference control or a topology control. A subsequent operation may be performed by each of the target terminal and the base stations after the interference control or the topology control is performed. As an example, when radio parameters, e.g., parameters associated with a network topology, transmission power, a beamforming vector, etc., are changed while the interference control or the topology control is performed, the target terminal and the base stations may newly update the radio parameters.

Figure 6:
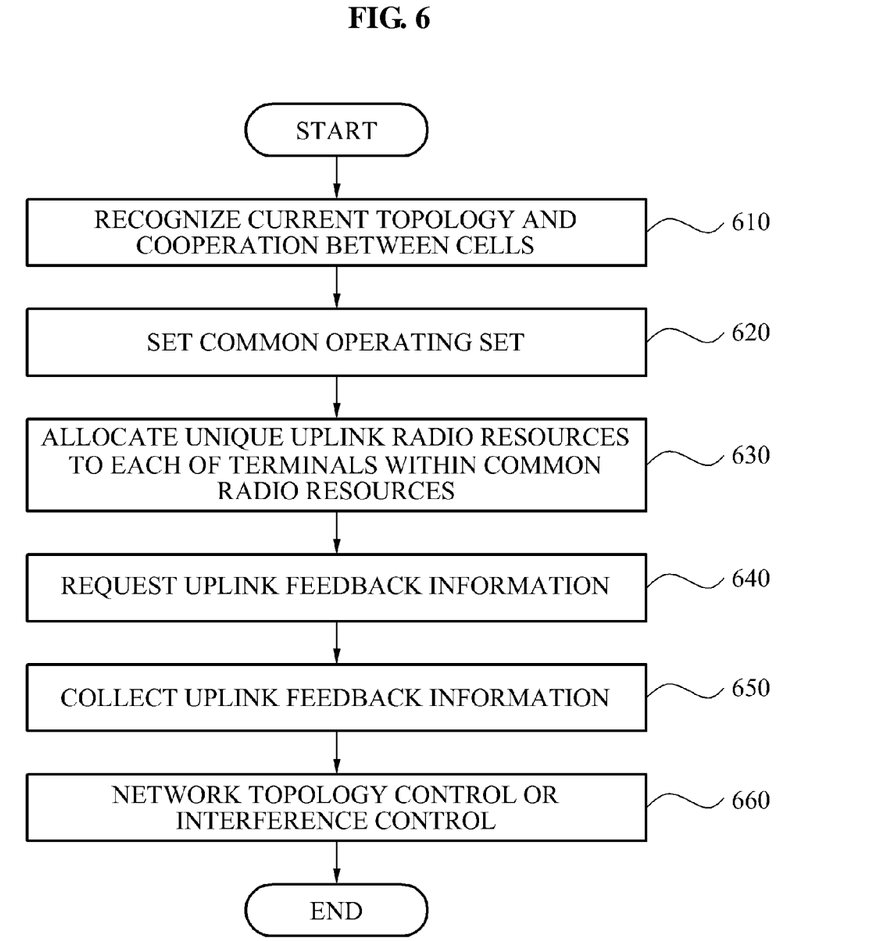
FIG. 6 is a flowchart illustrating a method of operating a central controlling apparatus according to example embodiments.

FIG. 6 illustrates a method of operating a central controlling apparatus, e.g., 210, 410, according to example embodiments.

Referring to FIG. 6, in operation 610, the central controlling apparatus 210, 410, may recognize a current network topology and cooperation status between cells.

That is, the central controlling apparatus 210, 410, may recognize whether a type of the current network topology is a bus type, a ring type, a star type, a tree type, and a message type, may recognize whether the cells cooperate with each other, and may recognize cells that cooperate.

In operation 620, in response to the topology control or the interference control being desired, the central controlling apparatus 210, 410, may set a common operating set including a plurality of cells. In one example, the central controlling apparatus 210, 410, may set the common operating set based on the current network topology or a cooperation status between the cells. For example, predetermined common radio resource may be allocated to the common operating set for a multi-cell common operation of the cells included in the common operating set.

In operation 630, in response to the common operating set is set, the central controlling apparatus 210, 410, may allocate unique uplink radio resources to each of the terminals included in the common operating set within the common radio resources. In one example, the central controlling apparatus 210, 410, may allocate identical time resources and identical frequency resources, and may allocate different code resources, to each of the to terminals.

In operation 640, the central controlling apparatus 210, 410, may request, via the plurality of base stations, that each of the terminals transmits uplink feedback information. In this instance, each of the terminals may transmit uplink feedback information to all base stations based on corresponding unique uplink radio resources. The plurality of base stations may receive the uplink feedback information from each of the terminals, and may transmit the uplink feedback information of each of the terminals to the central controlling apparatus 210.

In operation 650, the central controlling apparatus 210, 410, may collect the uplink feedback information of each of terminal transmitted from the base stations. That is, the central controlling apparatus 210, 410, may recognize information associated with a wireless environment between each of the terminals and each of the base stations. As an example, when a base station 1, a base station 2, and a base station 3 exist, the central controlling apparatus 210, 410, may recognize all information associated with a wireless environment between a predetermined terminal and each of the base station 1, the base station 2, and the base station 3.

In operation 660, the central controlling apparatus 210, 410, may perform the network topology control or the interference control based on the collected uplink feedback information of each of the terminals. Radio parameters may be changed or may be newly set based on the network topology control or the interference control, and the changed or newly set radio parameters are reported to the base stations.

Figure 7:
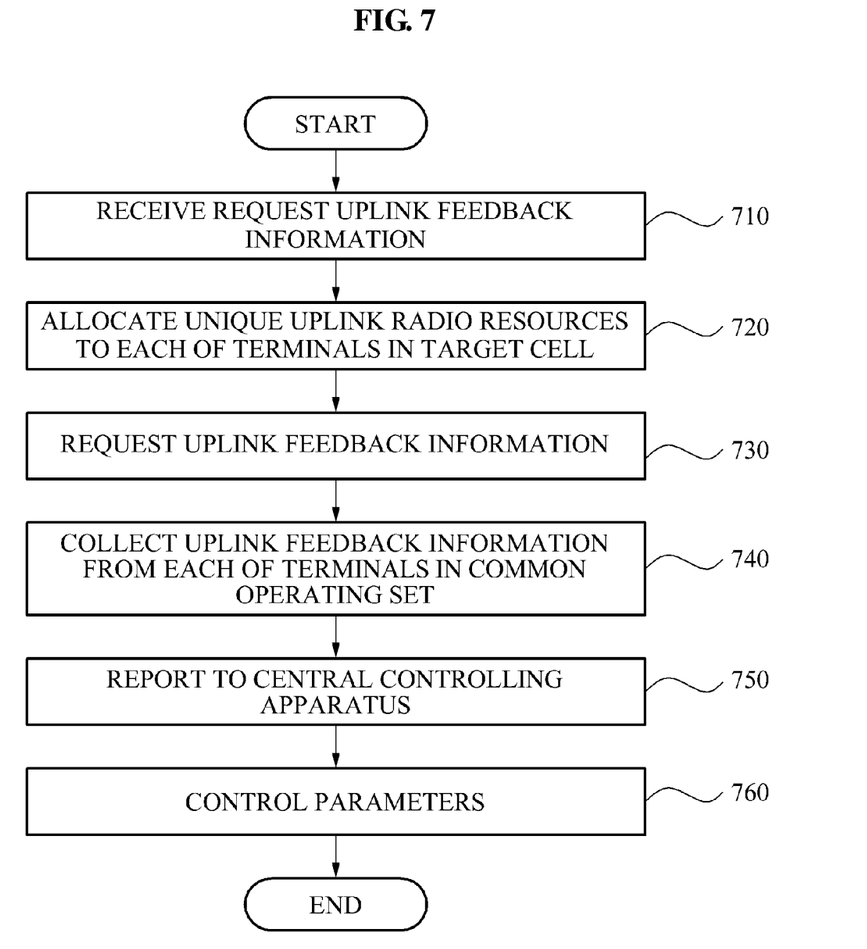
FIG. 7 is a flowchart illustrating a method of operating a base station according to example embodiments.

FIG. 7 illustrates a method of operating a base station according to example embodiments.

Referring to FIG. 7, in operation 710, a base station in a target cell may receive a request for uplink feedback information, from a central controlling apparatus 210. In operation 720, in response to the reception of the request, the base station may allocate unique uplink radio resources to each of terminals in the target cell among common radio resources. In operation 730, the base station may request each of the terminals to transmit the uplink feedback information.

In operation 740, the base station may collect uplink feedback information from each of terminals in a common operating set. The base station may report the uplink feedback information collected from each of the terminals to the central controlling apparatus 210, 410, in operation 750. In one example, the central controlling apparatus 210, 410, may perform an interference control or a network topology control, and may transmit changed or newly set radio parameters to all base stations in the common operating set. A base station in the target cell may control radio parameters based on the changed or newly set radio parameters in operation 760.

Figure 8:
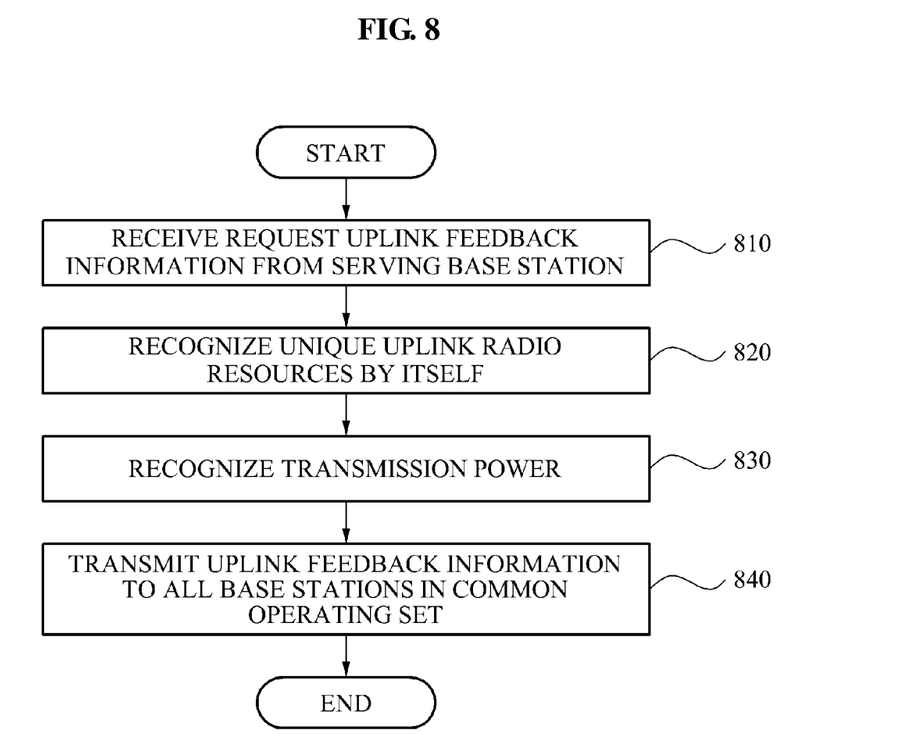
FIG. 8 is a flowchart illustrating a method of operating a target terminal according to example embodiments.

FIG. 8 illustrates a method of operating a target terminal according to example embodiments.

Referring to FIG. 8, in operation 810, the target terminal may receive a request for uplink feedback information from a serving base station. In operation 820, the target terminal may recognize unique uplink radio resources allocated to the target terminal. In operation 830, the target terminal may recognize transmission power. In operation 830, the target terminal may transmit uplink feedback information to all base stations based on the transmission power in a common operating set. In one example, the target terminal may sequentially increase the transmission power.

Figure 9:
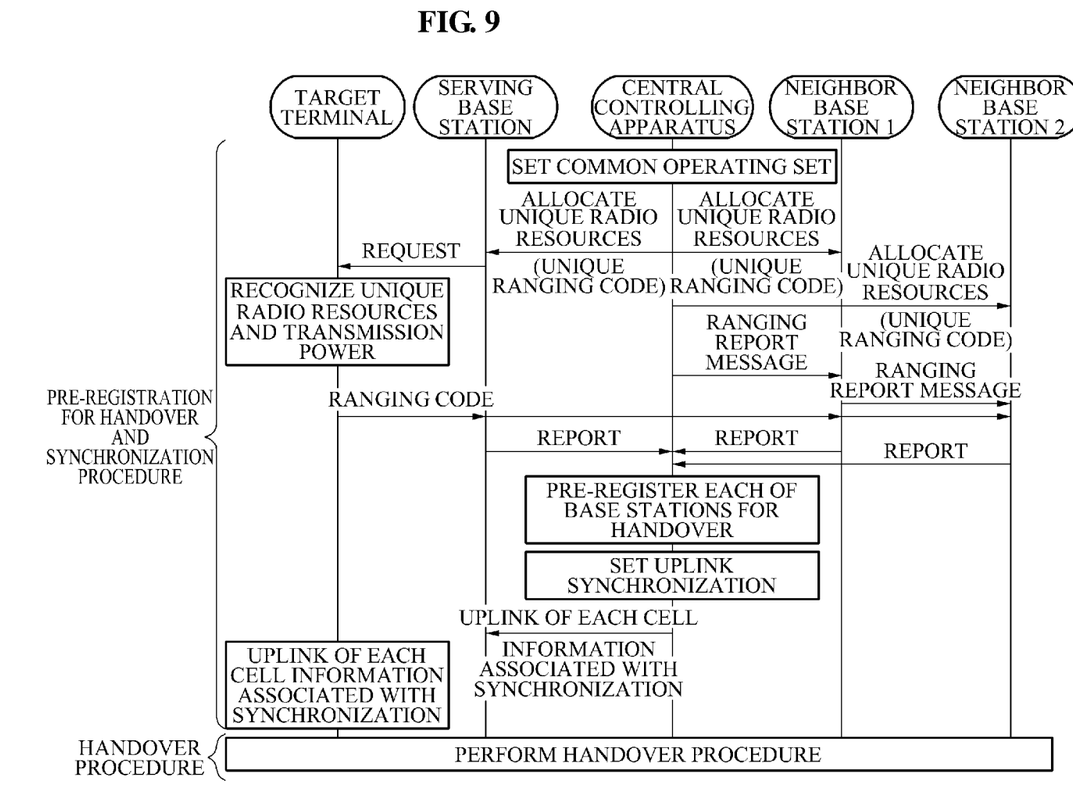
FIG. 9 is a flowchart illustrating a method in which various apparatuses included in a common operating set perform obtaining/setting of uplink synchronization according to example embodiments.

FIG. 9 illustrates a method in which various apparatuses included in a common operating set perform obtaining/setting of uplink synchronization according to example embodiments.

Referring to FIG. 9, the central controlling apparatus, e.g., 210, 410, may set a target terminal, a serving base station, a neighbor base station 1, and a neighbor base station 2 as a common operating set. That is, the central controlling apparatus 210, 410, may set base stations that perform an operation related to uplink synchronization of the target terminal as the common operating set. Hereinafter, the operation related to the uplink synchronization is referred to as a "multi-cell common operation."

The central controlling apparatus 210, 410, may allocate unique radio resources to the target terminal for uplink synchronization between the target terminal and each of the base stations when the common operating set is set. The central controlling apparatus 210, 410, may allocate unique radio resources to each of the terminals served by the neighbor base station 1 and each of the terminals served by the neighbor base station 2 when uplink synchronization of each of terminals served by the neighbor base station 1 and each of terminals served by the base station 2 is desired. In this instance, the central controlling apparatus 210, 410, may allocate identical frequency resources and identical time resources, and may allocate different code resources, e.g., a unique ranging code, to each of terminal included in the common operating set.

The serving base station may report the allocated unique ranging code, frequency resources, and time resources to each of terminals in a corresponding cell, e.g., a cell of the serving base station, and may request transmission of the ranging code. The neighbor base station 1 and the neighbor base station 2 may also request each corresponding terminal to transmit a corresponding ranging code.

The central controlling apparatus 210, 410, may transmit a ranging report message to each of the neighbor base station 1 and the neighbor base station 2 before the target terminal transmits the ranging code. For example, the ranging report message may indicate that the target terminal performs ranging.

The target terminal may perform ranging by transmitting corresponding ranging code to each of the serving base station, the neighbor base station 1, and the neighbor base station 2 when the ranging report message is transmitted to each of the neighbor base station 1 and the neighbor base station 2. In one example, the target terminal may sequentially increase transmission power until each of the serving base station, the neighbor base station 1, and the neighbor base station 2 successively receives the corresponding ranging code.

Each of the serving base station, the neighbor base station 1, and the neighbor base station 2 may successively receive the corresponding ranging code. Each of the serving base station, the neighbor base station 1, and the neighbor base station 2 may report information associated with the received corresponding ranging code to the central controlling apparatus 210, 410, 510. For example, the information transmitted by each of the serving base station, the neighbor base station 1, and the neighbor base station 2 may include a corresponding cell identifier and the received corresponding ranging code.

The central controlling apparatus 210, 410, may classify the reported information based on the serving base station, the neighbor base station 1, and the neighbor base station 2, and may recognize whether each of the serving base station, the neighbor base station 1, and the neighbor base station 2 receives the corresponding ranging code, e.g., may recognize synchronization information. In other words, the central controlling apparatus 210, 410, may analyze the information based on the cell identifier included in the information. Next, the central controlling apparatus 210, 410, may obtain uplink synchronization between the target terminal and the serving base station, uplink synchronization between the target base station and the neighbor base station 1, and uplink synchronization between the target base station and the neighbor base station 2. For example, the target terminal and the serving base station may have already communicated with each other, and thus, the uplink synchronization between the target terminal and the serving base station may be already obtained.

The central controlling apparatus 210, 410, may pre-register the neighbor base station 1 and the neighbor base station 2 for handover of the target terminal. Also, the central controlling apparatus 210, 410, may perform pre-registration for handover of other terminals, in addition to pre-registration for handover of the target terminal.

The uplink synchronization between the target terminal and the neighbor base station 1 and the uplink synchronization between the target terminal based on the report of the neighbor base station 1 and the report of the neighbor base station 2 may be set by the central controlling apparatus 210, 410, 510. The central controlling apparatus 210, 410, and may also transmit information associated with the uplink synchronization to the serving base station. In this instance, the serving base station may also transmit information associated with the uplink synchronization to the target terminal.

Accordingly, the target terminal may obtain the uplink synchronization with the neighbor base station 1 and the uplink synchronization with the neighbor base station 2 before performing handover to the neighbor base station 1 or to the neighbor base station 2. In general, after a target base station of the handover is selected, the target terminal may obtain uplink synchronization with the target base station. This may prevent the target terminal from being promptly handed over to the target base station. Conversely, example embodiments may obtain uplink synchronization of each candidate base station of the target base station, before the target base station for the handover is selected, more promptly performing the handover.

The target terminal may store and maintain information associated with uplink synchronization of each cell, e.g., uplink synchronization of each neighbor base station. When a handover procedure is initiated, the target base station may be selected. The target terminal may perform handover to the target base station without obtaining the uplink synchronization of the target base station, minimizing a delay in the handover procedure.

Figure 10:
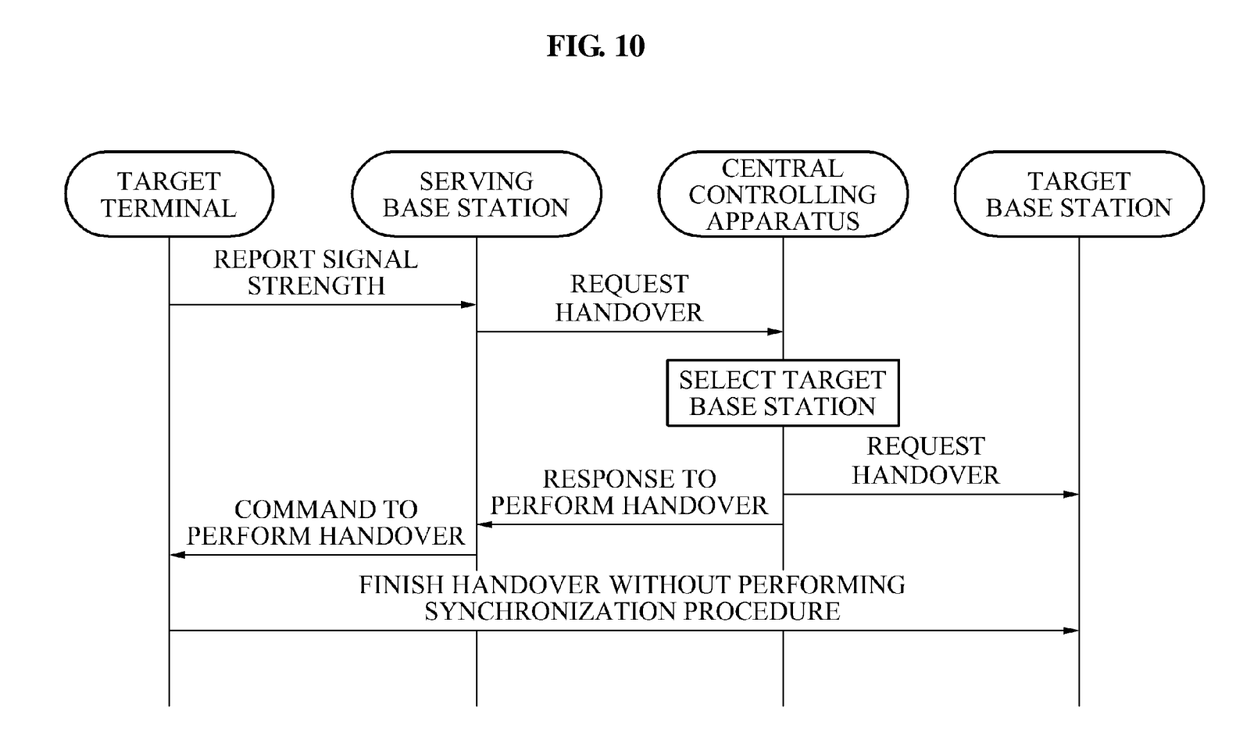
FIG. 10 is a flowchart illustrating a method in which various apparatuses included in a common operating set perform handover without performing an uplink synchronization procedure according to example embodiments.

FIG. 10 illustrates a method in which various apparatuses included in a common operating set perform handover without performing an uplink synchronization procedure, according to example embodiments.

Referring to FIG. 10, a target terminal may report a signal strength of a serving base station, and the serving base station transmits, to a central controlling apparatus 210, a request for handover when the signal strength of the serving base station is less than or equal to a predetermined level.

In one example, the central controlling apparatus e.g., 210, 410, 510, may select one of a plurality of neighbor base stations as a target base station of the handover. For example, the central controlling apparatus 210, 410, may manage neighbor base stations of which uplink synchronization is recognized from among the plurality of base stations as an uplink synchronization set. The central controlling apparatus 210, 410, may classify the neighbor base stations included in the uplink synchronization set according to a signal strength. The central controlling apparatus 210, 410, may manage neighbor base stations having a signal strength greater than or equal to the predetermined level as a candidate set, and may manage neighbor base stations having a signal strength less than the predetermined level as a non-candidate set. Also, the central controlling apparatus 210, 410, may classify the neighbor base stations based on whether downlink synchronization is recognized.

As an example, when uplink synchronization and downlink synchronization of neighbor base stations 1, 2, 3, and 4 are known to the central controlling apparatus 210, 410, 510, the central controlling apparatus 210, 410, may manage the neighbor base stations 1, 2, 3, and 4 as a known uplink synchronization set. In one example, when a signal strength of signals received by a target terminal from the neighbor base stations 1 and 2 is greater than or equal to the predetermined level, the neighbor base stations 1 and 2 may be managed as the candidate set, and when a signal strength of signals received by the target terminal from the neighbor base stations 3 and 4 is less than the predetermined level, the neighbor base stations 3 and 4 may be managed as the non-candidate set.

The central controlling apparatus 210, 410, may select one of neighbor base stations from the known uplink synchronization set or the candidate set, as the target base station. That is, the controlling apparatus may simply select the target base station using the known uplink synchronization set or the candidate set, reducing a complexity in determining the target base station.

Uplink synchronization between the target base station and the target base station selected by the central controlling apparatus 210, 410, has been already established, and thus, the target terminal and the target base station may not perform a separate operation for the uplink synchronization. Accordingly, the central controlling apparatus 210, 410, may select the target base station and may request handover of the target base station from the target base station without performing a separate operation for the uplink synchronization. Also, the central controlling apparatus 210, 410, may command the target terminal to perform handover via the serving base station.

Therefore, the target terminal may successively perform the handover to the target base station without performing the uplink synchronization with the target base station.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the terminal device described herein may refer to mobile devices such as a cellular phone, a personal digital assistant (PDA), a digital camera, a portable game console, and an MP3 player, a portable/personal multimedia player (PMP), a handheld e-book, a portable laptop and/or tablet PC, a global positioning system (GPS) navigation, and devices such as a desktop PC, a high definition television (HDTV), an optical disc player, a setup box, and the like capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of example embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The invention claimed is:

1. A method of operating a central controlling apparatus, the method comprising:
   setting a common operating set comprising a plurality of cells that perform a multi-cell common operation related to either interference control or network topology control;
   allocating unique uplink radio resources to each of multiple terminals in the common operating set among common radio resources allocated in advance for the common operating set, to enable each of the terminals to transmit corresponding uplink feedback information to a plurality of base stations; and
   collecting uplink feedback information of each of the terminals from each of the plurality of base stations, the uplink feedback information comprising information associated with a wireless environment of a corresponding terminal and a corresponding base station.

2. The method of claim 1, further comprising processing the collected uplink feedback information to perform the interference control and the network topology control.

3. The method of claim 1, wherein the allocating allocates, to each of the terminals, identical time resources, identical frequency resources, and different code resources within the common radio resources allocated in advance.

4. The method of claim 1, further comprising determining transmission power of the terminals based on a spatial area of the common operating set.

5. The method of claim 1, wherein the setting sets the common operating set based on either a current topology of the network or a cooperation status among the plurality of cells.

6. The method of claim 1, wherein the uplink feedback information of each of the terminals comprises information associated with a channel between a corresponding terminal and a corresponding base station.

7. The method of claim 1, further comprising:
   allocating unique downlink radio resources to each of the plurality of base stations among the common radio resources allocated in advanced for the common operating set, to enable terminals in the common operating set to receive corresponding control information from the plurality of base stations; and
   requesting each of the plurality of base stations to broadcast of the corresponding control information.

8. A non-transitory computer-readable recording medium storing a program implementing the method of claim 1.

9. A method of operating a base station, the method comprising:
   receiving, from a central controlling apparatus, a request for uplink feedback information after a common operating set is set, the common operating set comprising a plurality of cells that perform a multi-cell common operation related to interference control or network topology control;
   allocating unique uplink radio resources to each of multiple terminals included in a target cell from common radio resources allocated in advance for the common operating set, to enable each of the terminals included in the target cell among terminals in the common operation set to transmit corresponding uplink feedback information to a plurality of base stations; and
   receiving uplink feedback information of each of the terminals in the common operating set.

10. The method of claim 9, further comprising reporting, to the central controlling apparatus, about the received uplink feedback information.

11. The method of claim 10, further comprising:
   receiving, from the central controlling apparatus, a request related to either the interference control or the network topology control; and
   controlling wireless parameters related to the request about either the interference control or the network topology control.

12. A non-transitory computer-readable recording medium storing a program implementing the method of claim 9.

13. A method of operating a terminal, the method comprising:
   receiving a request, from a serving base station, for uplink feedback information after a common operating set is set, the common operating set comprising a plurality of cells that perform a multi-cell common operation related to interference control or network topology control;
   recognizing unique uplink radio resources allocated to a target terminal and transmission power of the target terminal, the unique uplink radio resources being allocated to the target terminal from common radio resources allocated in advance for the common operating set; and
   transmitting, to a plurality of base stations in the common operating set, corresponding uplink feedback information using the unique uplink radio resources and the transmission power.

14. A non-transitory computer-readable recording medium storing a program implementing the method of claim 13.

15. A method of operating a central controlling apparatus, the method comprising:

setting a common operating set comprising a plurality of cells that perform a multi-cell common operation related to uplink synchronization;

allocating a unique ranging code to each of multiple terminals included in a common operating set from common radio resources allocated in advance for the common operation set;

transmitting a ranging report message to a plurality of base stations in the common operating set to report that a target terminal performs ranging;

collecting information associated with a unique ranging code of the target terminal from each of the plurality of the base stations, the information associated with the unique ranging code of the target terminal being received by each of the plurality of base stations;

setting an uplink synchronization between each of the plurality of base stations and the target terminal based on the information associated with the unique ranging code of the target terminal; and     providing information associated with the set uplink synchronization to the target terminal.

16. The method of claim 15, further comprising selecting a target base station for handover of the target terminal from a known uplink synchronization set comprising the plurality of base stations, the uplink synchronization of each of the plurality of base stations being known to the target terminal.

17. The method of claim 16, wherein the selecting selects the target base station for handover of the target terminal from a candidate set comprising at least one of the plurality of base stations in the known uplink synchronization set, the at least one base station having a signal strength greater than or equal to a predetermined level.

18. The method of claim 15, wherein the allocating allocates, to each of the terminals included in the common operating set, identical time resources, identical frequency resources, and different unique ranging codes, within the common radio resources allocated in advance.

19. The method of claim 15, wherein the information associated with the unique ranging code of the target terminal comprises the unique ranging code of the target terminal received by each of the plurality of base stations, and a cell identifier of each of the plurality of base stations.

20. A non-transitory computer-readable recording medium storing a program implementing the method of claim 15.

* * * * *